Figure 1:
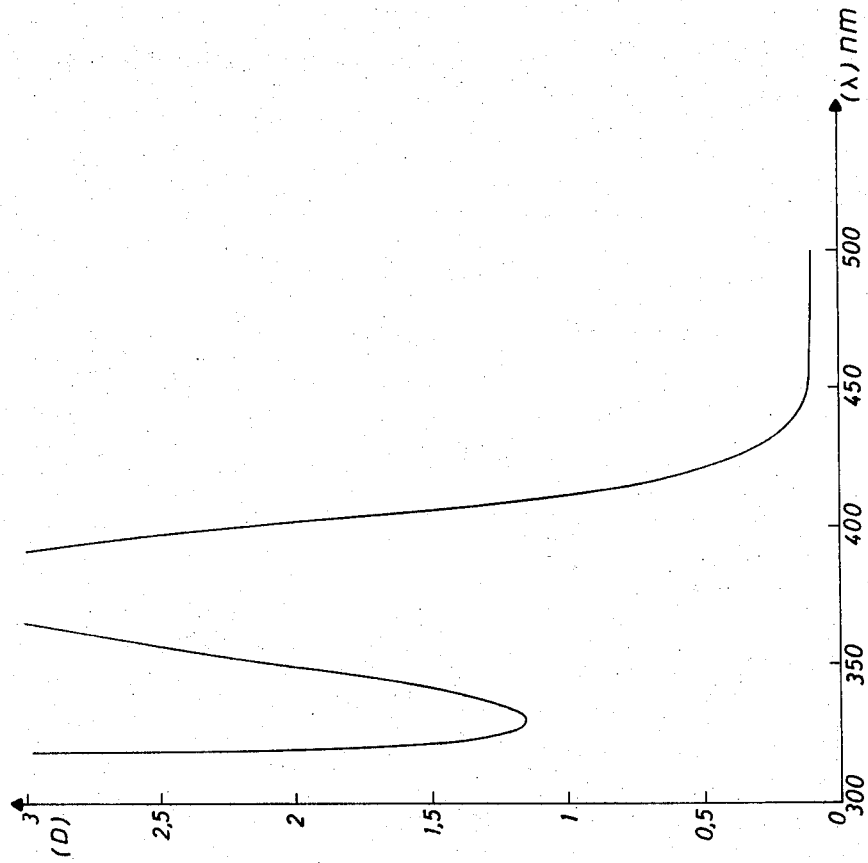

United States Patent [19]
Jeurissen et al.

[11] 3,849,658
[45] Nov. 19, 1974

[54] RADIOGRAPHIC RECORDING ELEMENT AND ITS USE IN RADIOGRAPHY

[75] Inventors: Lambert Gaston Jeurissen, Edegem; Romain Henri Bollen, Hove; Theofiel Hubert Ghys, Kontich; Renaat Frans Heylen, Deurne, all of Belgium

[73] Assignee: AGFA-Gevaert, N.V., Mortsel, Belgium

[22] Filed: Nov. 3, 1972

[21] Appl. No.: 303,407

[30] Foreign Application Priority Data
May 31, 1972 Great Britain.................... 25528/72

[52] U.S. Cl............................. 250/486, 250/483
[51] Int. Cl............................................ H01j 1/62
[58] Field of Search............................ 250/483, 486

[56] References Cited
UNITED STATES PATENTS
2,403,227   7/1946   Leverenz ...................... 250/486 X
3,314,894   4/1967   Nyilas et al. .................... 250/483 X
3,617,285   11/1971  Staudenmayer ............... 250/483 X Primary Examiner—Archie R. Borchelt
Attorney, Agent, or Firm—A. W. Breiner

[57] ABSTRACT

A radiographic image-recording element comprising a support bearing ultraviolet-sensitive silver halide emulsion layers on opposite sides thereof and comprising between said layers and/or in said layers, a non-fluorescent ultraviolet-absorbing substance corresponding to the general formula:

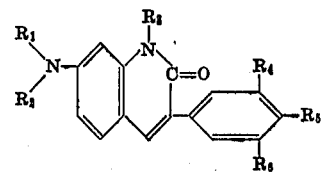

wherein: each of $R_1$, $R_2$ and $R_3$ independently of each other stands for an aliphatic group, each of $R_4$, $R_5$ and $R_6$ independently of each other stands for hydrogen, alkyl, alkoxy or halogen.

20 Claims, 2 Drawing Figures

RADIOGRAPHIC RECORDING ELEMENT AND ITS USE IN RADIOGRAPHY

The present invention relates to an improved radiographic recording element and its use in radiography.

It is known that common X-ray films for the information-wise recording of radiographic radiations comprise a transparent support, which is coated at least on one side with a photo-sensitive silver halide emulsion layer.

X-ray films are mainly used in conjunction with intensifying screens. The commonly used screens consist of a fluorescent layer coated on one side of a support. The fluorescent substance converts X-rays into rays which are actinic for the photographic layers. Fluorescent substances or phosphors used in commercially available fluorescent screens are e.g. calcium tungstate, lead-activated barium sulphate and barium phosphate activated with a suitable dose of europium.

Of these fluorescent substances the lead-activated barium sulphate and europium-activated barium ortho phosphate are emitting mainly in the ultra-violet range of the spectrum, whereas calcium tungstate lights up for a great deal in the visible part of the spectrum, i.e., beyond 400 nm.

Other phosphors, which emit in the ultraviolet region of the spectrum include europium-activated barium sulphate, lead-activated strontium sulphate, europium-activated strontium sulphate, cerium-activated barium sulphate, lead sulphate, lead-activated barium silicates, gadolinium-activated yttrium oxide, barium fluoride and europium-activated barium strontium sulphate and the like, the preparation of which is described, e.g., in the French Pat. Specification 1,555,624.

The use of screens based on fluorescent substances has the advantage that the light-sensitive silver halide material is exposed with ultraviolet radiation or visible light, for which the silver halide crystals are more sensitive than for direct incident X-ray radiations. Therefore, the use of fluorescent screens makes possible a reduction of the radiation dose to a considerable amount.

The use of fluorescent screens has the disadvantage of yielding a reduced image sharpness, which arises particularly by using silver halide materials having on both sides of a support that is transparent for fluorescent light, a silver halide emulsion layer, which during the X-ray exposure stands in close contact with a fluorescent screen.

Indeed, the light emitted by one of these fluorescent screens, gives rise not only to an image-wise blackening in the adjacent silver halide emulsion layer, but penetrates also to a considerable amount through the relatively thick support and gives rise to an unsharp image in the oppositely situated silver halide emulsion layer. This phenomenon is called "cross-over." The degree of cross-over substantially determines the quality of the image obtained in the radiographic recording material.

The cross-over image is unsharp because of the diffusion of light in the different layers and support-sheet of the recording material and also because of the light refraction and the light reflection taking place at the boundaries of said layers and support sheet. An additional lack of sharpness is caused by a reflection of light at the boundary surface between the silver halide emulsion layers and the support.

It is an object of the present invention to diminish the disadvantages of the "cross-over" at a substantial degree by absorbing the cross-over light in one or more layers situated between the emulsion layers coated at both sides of the support and to improve thereby the sharpness of the image obtained with photosensitive silver halide materials exposed in conjunction with intensifying screens having more than half of their spectral emission at less than about 410 nm.

It has been found that an improved image sharpness is obtained by the use of fluorescent screens that are capable of emitting mainly in the spectral wavelength range below 410 nm when struck by penetrating radiation and which screens are in working contact in effective relationship with a radiographic image-recording element comprising a support, which bears ultraviolet-sensitive silver halide emulsion layers on opposite sides thereof and between said layers has a non-fluorescing ultraviolet-absorbing substance, which absorbs for at least 75 percent below 410 nm and corresponds to the following general formula:

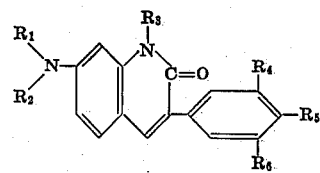

wherein:
each of $R_1$, $R_2$ and $R_3$ independently of each other stands for an aliphatic group including a substituted aliphatic group, e.g., a lower alkyl group, ($C_1$-$C_5$) methyl or ethyl being preferred, an aralkyl group, e.g., benzyl, or a cycloalkyl group, e.g., cyclohexyl, and
$R_4$, $R_5$ and $R_6$ independently of each other, each stands for hydrogen, an alkyl group, e.g., a lower ($C_1$-$C_5$) alkyl group, an alkoxy group, e.g., methoxy, or halogen.

When using the term "penetrating radiation" we designate thereby highly energetic radiations such as X-rays, $\gamma$-rays, $\beta$-rays or fast electrons, e.g., as obtained in an electron microscope, and neutrons.

Compounds within the scope of the above mentioned general formula are prepared, e.g., according to the Canadian Pat. Specification 788,892 and the German Published Pat. application (D.O.S.) P2013410.

The above-mentioned ultraviolet-absorbing substances are non-fluorescing under X-ray radiation and are colourless or only slightly yellow. They can remain in the recording material without detrimental effect on the image quality even after processing, which is a particular advantage.

Indeed, the ultraviolet, non-fluorescing absorbers being essentially non colour-imparting obviate extensive leaching or bleaching processes as are required for fugitive type and highly coloured absorbers.

In general, the ultraviolet-absorbing substances used in the practical application of this invention should possess the characteristics of solvent stability and compatibility with other light-absorbing materials, which possess analogous characteristics, in order that they can be used alone or in combination therewith.

The U.V. absorbers are most effective at wavelengths of less than 410 nm so that they are very advantageously used in silver halide recording materials that are X-ray exposed in conjunction with fluorescing screens emitting for at least 50 percent in the wavelength range below 410 nm.

Suitable fluorescing substances for producing such screens are known by those skilled in the art and are described, e.g., by O. Mattson in "Practical Photographical Problems in Radiography," Stockholm, 1955, pages 71–76, The Photographic Journal, Section B, Vol. 85B, (1945) 75–91, U.S. Pat. Spec. No. 3,527,710 and in the French Pat. Specification 1,555,624.

Preferred ultraviolet-absorbing substances suited for the purpose of the present invention correspond to the following structural formulae:

1.
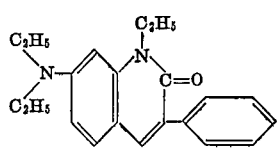

2.
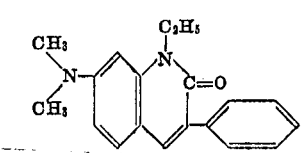

The absorption versus wavelength curve of the latter compound is given in FIG. 1. The course of this curve is very steep towards the visible light range and the compound is strongly absorbing ultraviolet radiation in the range of 400–350 nm.

Figure 2:
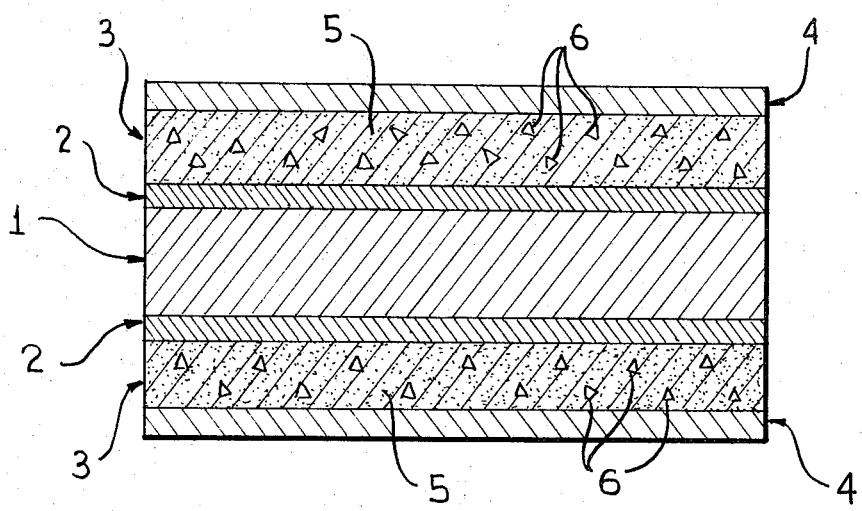

FIG. 2 is a cross-section of a photographic element of the present invention.

The above mentioned ultraviolet-absorbing substances can be incorporated either in the support or in the subbing layer(s) or in at least two sites of them.

The ultraviolet-absorbing substances can be incorporated in the support during its preparation, e.g., in the melt phase before extrusion as is the case, e.g., with polyethylene terephthalate, or incorporated by mixing in the original solution from which the corresponding support is produced as is the case, e.g., with cellulose triacetate. Still another method of incorporating said substances is mixing them with the substance(s) of the subbing layer(s). When incorporated in the support the above described ultraviolet-absorbing substances are added in a range from about 50 to about 2,000 parts per million to a powdered linear polyester resin prior to extrusion of the polyester in the form of a film. When incorporated in the subbing layer amounts of ultraviolet-absorbing substances are added in a range from about 25 to about 1,000 parts per million.

In the radiographic combination of X-ray intensifying screens and ultraviolet-sensitive radiographic materials used in the present invention, said screens may be arranged as separate elements held in contact with the radiation-sensitive silver halide material or they may form with the silver halide emulsion material an integral arrangement so that on one and the same support both the silver halide emulsion layers and the X-ray intensifying screens are provided. Photographic elements to be considered as unitary combination for radiographic recording comprising an intimate association of (an) intensifying screen(s) and (a) silver halide emulsion layer(s) coated on opposite sides of a support are described, e.g., in the U.S. Pat. Spec. No. 2,887,379.

The radiographic combination of intensifying screens and radiographic materials may further comprise the common intermediate and/or protective and/or stripping layers, which may be arranged between or over the radiographic-sensitive emulsions and the intensifying screens.

Preferably radiographic materials are used that during the X-ray exposure have intensifying screens contacting the silver halide emulsion layers coated at opposite sides of a transparent support.

The silver halide coating used in combination with the present ultaviolet-absorbing compounds may contain varying amounts of silver chloride, silver iodide, silver bromide, silver chlorobromide, silver bromoiodide and the like. Particularly good results are obtained with silver bromoiodide emulsions in which the average grain size of the silver bromoiodide grains is in the range of about 0.1 $\mu$ and 5 $\mu$ and preferably in the range of 0.5 $\mu$ and 0.6 $\mu$. The amount of silver halide can vary between very large ranges of about 12 g/m2 and 3 g/m2 and is preferably in the range of about 8 g/m2.

The amount of silver per m2 can be reduced by using fine grain emulsions, because it is known that the covering power increases with decreasing grain size (ref. P. Glafkides, Photographic Chemistry, Vol. I, p. 89–90 - Fountain Press London 1958).

By the term "covering power" is understood the reciprocal value of the photometric equivalent of the developed silver, i.e., the number of grams of silver per sq. decimetre divided by the optical density.

Another method for economizing on the silver halide content in the emulsion is realized by introducing (a) colour coupler(s) into the emulsion which at least at the stage of the development form(s) (a) dye(s) with the oxidation product of an aromatic primary developing agent, e.g., of the p-phenylenediamine type, which dye(s) absorb(s) in the visible part of the spectrum.

In order to further reduce the consumption of silver halide preferably so-called 2-equivalent couplers can be used that need only two instead of four molecules of exposed silver halide for the production of one dye molecule. Such couplers contain in the coupling position, e.g., a halogen atom such as iodine, bromine, or chlorine (see therefor, e.g., the U.S. Pat. Spec. 3,006,759). The density of the image is thus realized by addition of the densities of the silver image(s) combined with those of the dye image(s).

For improving the information content retrieval phenol or $\alpha$-naphthol type colour couplers that on colour development of the silver halide with an aromatic primary amino developing agent form a quinoneimine dye mainly absorbing in the red and also absorbing in the green and having an absorption maximum in the spectral wavelength range of 550 to 700 nm, are particularly suitable. (ref. is made to the German Published Pat. Application DOS P 1946652).

Phenol couplers suited for that purpose correspond, e.g., to the following general formula:

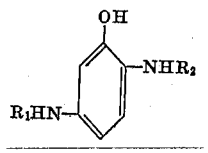

wherein:
each of $R_1$ and $R_2$ represents a carboxylic acid acyl or sulphonic acid acyl group including said groups in substituted state, e.g., an aliphatic carboxylic acid acyl group, an aromatic carboxylic acid acyl group, an heterocyclic carboxylic acid acyl group, e.g. a 2-furoyl group or a 2-thienoyl group, an aliphatic sulphonic acid acyl group, an aromatic sulphonic acid acyl group, a sulfphonyl thienyl group, an aryloxy-substituted aliphatic carboxylic acid acyl group, a phenyl carbamyl aliphatic carboxylic acid acyl group or a tolyl carboxylic acid acyl group.

For such types of phenol colour couplers and their preparation reference may be made to U.S. Pat. Nos. 2,772,162 and 3,222,176, and to United Kingdom Pat. Specification 875,773.

The use of ultraviolet-emitting screens is particularly interesting because the used silver halide has its optimum sensitivity in the ultraviolet and blue part of the electromagnetic spectrum (ref. P. Glafkides, Photographic Chemistry, Vol. II, p. 527 and 528 — Fountain Press, London, 1960).

The optimum efficiency in respect to speed is obtained when the maximum of the radiation absorption of the ultraviolet range of the emulsion corresponds with the wavelength at which maximum emission of energy of the screen is obtained. See therefor, e.g., "Phosphor for a Faster X-Ray" Chem. Eng. News 48, 1970 (rear side of the cover page).

The image-forming silver halide emulsion may be chemically sensitized by any of the accepted procedures. They may be digested with naturally active gelatin or with small amounts of sulphur-containing compounds such as allyl thiocyanate, allylthiourea, sodium thiosulphate, etc. The image-forming emulsion may also be sensitized by means of reductors, e.g., tin compounds as described in the United Kingdom Patent Specification 789,823, polyamines, e.g. diethyltriamine, and small amounts of noble metal compounds such as of gold, platinum, palladium, iridium, ruthenium, and rhodium as described by R. Koslowsky, Z.Wiss.Phot. 46, 67–72 (1951). Representative examples of noble metal compounds are ammonium chloropalladate, potassium chloroplatinate, potassium chloroaurate and potassium aurithiocyanate.

Emulsion stabilizers and antifoggants may be added to the silver halide emulsion before or after admixture of the low-speed emulsion, for instance, the known sulphinic and selenic acids or salts thereof, aliphatic, aromatic or heterocyclic mercapto compounds or disulphides, e.g., those described and claimed in published German Patent Application 2,100,622, preferably comprising sulpho groups or carboxyl groups, mercury compounds, e.g., those described in Belgian Patent Specification 524,121 - 677,337 - 707,386 and 709,195 and tetra-azaindenes as described by Birr in Z.Wis-s.Phot. 47, 2-58 (1952), e.g., the hydroxy tetra-azainedenes of the following general formula:

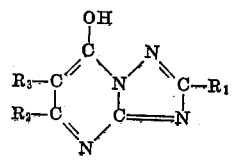

wherein:
each of $R_1$ and $R_2$ represents hydrogen, an alkyl, an aralkyl, or an aryl group, and
$R_3$ represents hydrogen, an alkyl, a carboxy, or an alkoxycarbonyl group, such as 5-methyl-7-hydroxy-s-triazolo [1,5-a]-pyrimidine.

Other additives may be present in one or more of the hydrophilic colloid layers of the radiation-sensitive silver halide elements of the present invention, e.g., hardening agents such as formaldehyde, dialdehydes, hydroxyaldehydes, mucochloric and mucobromid acid, acrolein, and glyoxal, mordanting agents for anionic colour couplers or dyes formed therefrom e.g. as described in United Kingdom co-pending Patent Application 42381/71, plasticizers and coating aids, e.g., saponin, dialkylsulphosuccinic acid salts such as sodium diisooctyl sulphosuccinate, alkylaryl polyethersulphuric acids, alkylaryl polyethersulphonic acids, carboxyalkylated polyethylene glycol ethers or esters as described in French Patent Specification 1,537,417 such as iso-$C_8H_{17}$-$C_6H_4$(OCH$_2$CH$_2$)$_8$ OCH$_2$COONa, fluorinated surfactants, e.g., those described in Belgian Patent Specification 742,680 and the published German Patent Applications 1,950,121 and 1,942,665, and inert particles such as silicon dioxide, glass, starch and polymethyl methacrylate particles.

For the purpose of accelerating the development the exposed photographic material is developed preferably in the presence of development accelerators. These development accelerators can be used either in the silver halide emulsion or in the developing bath. They include alkylene oxide compounds of various types, e.g., alkylene oxide condensation products or polymers as described in U.S. Pat. Spec. Nos. 1,970,578 - 2,240,472 - 2,423,549 - 2,441,389 - 2,531,832 and 2,533,990 and in United Kingdom Patent Specifications 920,637 - 940,051 - 945,340 - 991,608 and 1,015,023. Other development accelerating compounds are onium and polyonium compounds preferably of the ammonium, phosphonium, and sulphonium type, e.g., trialkyl sulphonium salts such as dimethyl-n-nonyl sulphonium p-toluene sulphonate, tetraalkyl ammonium salts such as dodecyl trimethyl ammonium p-toluene sulphonate, alkyl pyridinium and alkyl quinolinium salts such as 1-m-nitrobenzyl quinolinium chloride and 1-dodecyl pyridinium chloride, bisalkylene pyridinium salts such as N,N'-tetramethylene bispyridinium chloride, quantemary ammonium and phosphonium polyoxylakylene salts especially polyoxyalkylene bispyridinium salts, examples of which can be found in U.S. Pat. Spec. No. 2,944,900, etc.

After radiographic exposure the radiographic silver halide elements of the present invention are developed preferably in an energetic surface developer. The high energy is required in order to allow the development to proceed quickly and can be obtained by properly alkalizing the developing liquid (pH 9–12), and by using high-energy developing substances or a combination of developing substances, which as a consequence of their superadditive action is very energetic.

When colour images are prepared together with silver images, use is made of aromatic primary amino colour developing agents, e.g., N,N-diaklyl-p-phenylenediamines and derivatives thereof, e.g. N,N-diethyl-p-phenylenediamine, N-butyl-N-sulphobutyl-p-phenylenediamine, 2-amino-5-diethylaminotoluene hydrochloride, 4-amino-N-ethyl-N-($\beta$-methane sulphonamidoethyl)-m-toluidine sesquisulphate monohydrate and N-hydroxy-ethyl-N-ethyl-p-phenylenediamine. The colour developer can be used together with black-and-white developing agents, e.g., 1-phenyl-3-pyrazolidinone and p-monomethylaminophenol, which are known to have a superadditive effect on colour development (see L.F.A. Mason, J.Phot.Sci. 11 (1963) 136–139), and other p-aminophenol derivatives, e.g., those according to French Patent Specification 1,283,420 such as 3-methyl-4-hydroxy-N,N-diethylaniline, 3-methyl-4-hydroxy-N-ethyl-N-$\beta$-hydroxyethylaniline, 1-methyl-6-hydroxy-1,2,3,4-tetrahydroquinoline, 1-$\beta$-hydroxyethyl-6-hydroxy-1,2,3,4-tetrahydroquinoline, N-(4-hydroxy-3'-methylphenyl)-pyrrolidine, etc. It is also possible to use combinations of aromatic primary amino colour developing agents to obtain an increased rate of colour development (see e.g. German Patent Specification 954,311 and French Patent Specification 1,299,899); favourable effects are obtained, e.g., by the use of N-ethyl-N-2-hydroxyethyl-p-phenylenediamine together with N-butyl-N-sulphobutyl-p-phenylenediamine, 2-amino-5-diethylamino-toluene hydrochloride or N,N-diethyl-p-phenylenediamine hydrochloride. A superadditive colour development effect is also obtained when a tetraalkyl p-phenylenediamine derivative is used together with an aromatic primary amino colour development agent.

The developing solutions may also comprise any of the usual additional ingredients, e.g., sodium sulphite and hydroxylamine or derivatives thereof, hardening agents, antifoggants e.g. benzotriazole, 5-nitrobenzimidazole, 5-nitro-indazole, halides such as potassium bromide, silver halide solvents, toning and intensifying compounds, solvents, e.g., dimethylformamide, dimethylacetamide and N-methyl-pyrrolidone, for chemical ingredients that are difficult to dissolve in the preparation of the developing solutions or that tend to precipitate upon standing, etc.

The radiation-sensitive emulsions for use in the present invention may be coated on a wide variety of supports, e.g., films of cellulose nitrate, cellulose esters, polyvinylacetal, polystyrene, polyethylene terephthalate and other polyester materials.

Preferred supports comprise a linear condensation polymer, polyethylene terephthalate being an example thereof.

The supports used in the present recording materials may be coated with subbing layers for improving the adhesion thereto of (a) gelatino-silver halide emulsion layer(s).

The mechanical strength of melt-extruded support of the polyester type can be improved by stretching. In some cases, as described in the United Kingdom Patent Specification 1,234,755, the support may carry a subbing layer in the stretching stage.

Suited subbing layers are known to those skilled in the art of silver halide photography. With regard to the use of hydrophobic film supports reference is made to the composition of subbing layers described in the United Kingdom Patent Specification 1,234,755.

According to said specification hydrophobic film supports have a layer, which is directly adherent to the said hydrophobic film support and comprises a copolymer formed from 45 to 99.5 percent by weight of at least one of the chlorine-containing monomers vinylidene chloride and vinyl chloride, from 0.5 to 10 percent by weight of at least an ethylenically unsaturated hydrophilic monomer, and from 0 to 54.5 percent by weight of at least one other copolymerisable ethylenically unsaturated monomer, and a layer comprising in a ratio of 1:3 to 1:0.5 by weight a mixture of gelatin and a copolymer of 30 to 70 percent by weight of butadiene with at least one copolymerisable ethylenically unsaturated monomer. The supports are substantially transparent or lightly tinted, e.g., blue.

The exposed radiographic elements of the present invention are preferably processed in an automatic processing apparatus for X-ray films in which the photographic material may be guided automatically and at a constant speed from one processing unit to the other, but it will be understood by those skilled in the art that the radiographic image recording elements disclosed herein can also be processed apart from the above mentioned automatic processing apparatus in a variety of ways, such as by using the manual conventional multitank methods well known in the art.

For common emulsion preparation processes and the use of particular emulsion ingredients that may be applied in conjunction with the present recording materials reference is made in general to the Product Licensing Index of Dec. 1971 in which the following terms are dealt with in more details:

| | |
|---|---|
| I/II | Emulsion type and preparation of said element |
| III | Chemical sensitization |
| IV | Development modifiers |
| V | Antifoggants and stabilizers |
| VI | Developing agents |
| VII | Hardeners |
| VIII | Binding agents or polymers for silver halide layers and other layers |
| IX | Antistatic layers |
| X | Supports |
| XI | Plasticizers and lubricants |
| XII | Coating aids |
| XV | Spectral sensitization agents for silver halides |
| XXIII | Colour material ingredients |
| XVI | Absorbing and filter dyes |
| XXI | Physical development systems |
| XVII + XVIII | Addition agents and coating procedures. |

The following examples and FIG. 2 of the drawing, which is a cross-section of a photographic element of the present invention, more particularly illustrate the present invention.

Example 1

A silver bromoiodide X-ray emulsion (2mole percent of silver iodide) was prepared in such a way that it contained silver halide grains with an average grain size of 1.25 $\mu$ and comprised per kg an amount of silver halide corresponding to 190 g of silver nitrate and 74 g of gelatin. As stabilizing agents the emulsion contained per kg 545 mg of 5-methyl-7-hydroxy-s-triazolo[1,5-a] pyrimidine, 6.5 mg of 1-phenyl-5-mercaptotetrazole, and 0.45 mg of mercury cyanide. The covering power obtainable with said emulsion was 30.

The above emulsion was coated on both sides of a polyethylene terephthalate support 1 having subbing layers 2 thereon. The coating was carried out so that on each side of the support 1 a silver halide emulsion layer 3 was obtained containing an amount of silver halide equivalent to 7 g of silver nitrate per sq. m in the gelatin binder 5.

The polyethylene terephthalate support contained per sq.m. 250 mg of U.V.-absorbing substance corresponding with the following structural formula:

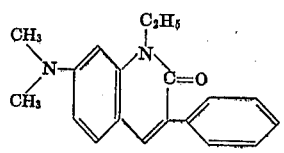

Each emulsion layer 4 was coated with a gelatino antistress layer at a coverage of 1 g/m2.

The obtained photosensitive material and a material identical to the above described with this difference however, that it does not contain said U.V.-absorbing substance were exposed with a 70 kV X-ray radiation through a test object being a line screen made of lead wherein the width of the bars of the screen gradually diminishes, and their spatial frequency (number per millimetre) gradually increases from one side of the test object to the other. By applying such a test object in the exposure it is possible to obtain an objective value for the resolving power independently of subject contrast by determining the "modulation transfer function." The modulation transfer function (MTF) in connection with frequency response or resolving power has been discussed by C. E. Kenneth Mees and T. H. James — The Theory of the Photographic Process — 3rd Ed. p. 503–505 and 514–518.

During the exposure the silver halide materials were kept between two ultraviolet light emitting fluorescent screens comprising as fluorescent material barium sulphate/lead sulphate.

The exposed materials were processed in an automatic 90 seconds processing machine the development occurring for 23 seconds at 35°C in Agfa-Gevaert's hardening developer G 138 containing hydroquinone and 1-phenyl-3-pyrazolidinone as developing agents and glutaraldehyde as hardener.

The modulation transfer function of both test materials was derived from the measurements obtained by scanning the line pattern obtained in these materials with a microdensitometer.

From the modulation transfer function results appeared that with the material containing the above mentioned ultraviolet-absorber a markedly favourable modulation transfer function and consequently sharper images could be obtained than with the material not containing said ultraviolet absorber.

Example 2

A silver bromoiodide X-ray emulsion (1.5 mole percent of silver iodide) was prepared in such a way that it contained silver halide grains with an average grain size of 0.60 $\mu$ and comprised per kg an amount of silver halide corresponding to 190 g of silver nitrate and 74 g of gelatin. As stabilizing agents the emulsion contained per kg 545 mg of 5-methyl-7-hydroxy-s-triazolo[1,5-a] pyramidine, 6.5 mg of 1-phenyl-5-mercaptotetrazole, and 0.45 mg of mercury cyanide. The "covering power" obtainable with said emulsion was 60.

The above emulsion was coated on both sides of a double side subbed polyethylene terephthalate support in such a way that on each side of the support a silver halide emulsion layer was obtained containing an amount of silver halide equivalent to 6 g of silver nitrate per sq.m.

The polyethylene terephthalate support contained per sq.m 250mg of U.V.-absorbing substance corresponding with the following structural formula:

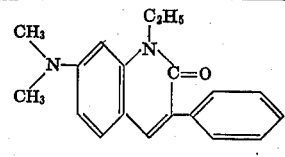

Each emulsion layer was coated with a gelatino antistress layer at a coverage of 1 g/m2.

The obtained photosensitive material and a material identical to the above described with this difference, however, that it does not contain said U.V.-absorbing substance were exposed with a 70 kV X-ray radiation through a test object as defined in Example 1, while said materials being arranged between two fluorescent screens comprising as fluorescent material barium sulphate/lead sulphate.

The exposed materials were processed in an automatic 90 seconds processing machine the development occurring for 23 seconds at 35°C in Agfa-Gevaert's hardening developer G 138 containing hydroquinone and 1-phenyl-3-pyrazolidinone as developing agents and glutaraldehyde as hardener.

From the modulation transfer function results appeared that with the material containing the abovementioned ultraviolet-absorber a markedly higher image sharpness than with the material not containing said ultraviolet absorber was obtained.

We claim:

1. A radiographic image-recording element comprising a support bearing ultraviolet light-sensitive silver halide emulsion layers on opposite sides thereof and containing between said layers, or in said layers, a nonfluorescent ultraviolet light-absorbing substance corresponding to the formula:

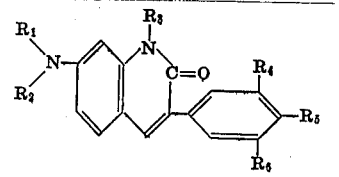

wherein:
each of $R_1$, $R_2$ and $R_3$ independently of each other stands for an aliphatic group, each of $R_4$, $R_5$ and $R_6$ independently of each other stands for a member of the group consisting of hydrogen, alkyl, alkoxy and halogen.

2. The element according to claim 1, wherein the support includes a linear condensation polymer.

3. The element according to claim 1, wherein the support is a polyethylene terephthalate polymer.

4. The element according to claim 1, in which said support contains said ultraviolet light-absorbing substance.

5. The element according to claim 1, wherein said support includes a hydrophobic film having superposed thereon in succession a layer which is directly adherent to the said hydrophobic film and comprises a copolymer formed from 45 to 99.5 percent by weight of at least one of the chlorine-containing monomers vinylidene chloride and vinyl chloride, from 0.5 to 10 percent by weight of at least one ethylenically unsaturated hydrophilic monomer, and from 0 to 54.5 percent by weight of at least one other copolymerizable ethylenically unsaturated monomer, and a layer comprising in a ratio of 1:3 to 1:0.5 by weight a mixture of gelatin and a copolymer of 30 to 70 percent by weight of butadiene with at least one copolymerizable ethylenically unsaturated monomer.

6. The element according to claim 1, wherein the ultraviolet light-absorbing substance is present in an amount of 10 mg to 500 mg per sq.m.

7. The element according to claim 1, wherein the ultra-violet light-absorbing substance is present in the support in a range of from about 50 to about 2,000 parts per million.

8. The element according to claim 1, wherein the ultraviolet light-absorbing substance is present in a subbing layer in a range of from about 25 to about 1,000 parts per million.

9. The element according to claim 1, wherein the silver halide emulsion layers comprise bromoiodide grains having a mean grain size of from about 0.1 $\mu$ to about 5 $\mu$.

10. The element according to claim 1, wherein the silver halide emulsion layers contain an amount of silver halide equivalent to about 3 to 8 g silver per sq.m.

11. The element according to claim 1, wherein the silver halide emulsion layers contain a colour coupler for forming a dye with an oxidized p-phenylenediamine developing agent.

12. The element according to claim 1, wherein the colour coupler is a phenol or $\alpha$-naphthol colour coupler that on colour development of the silver halide with an aromatic primary amino developing agent forms a quinoneimine dye mainly absorbing in the red and also absorbing in the green and having an absorption maximum in the spectral wavelength range of 550 to 700 nm.

13. The element described in claim 11, wherein the color coupler is a phenol, which corresponds to the formula:

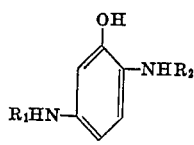

wherein: each of $R_1$ and $R_2$ represents a member of the group consisting of a carboxylic acid acyl and sulphonic acid acyl group.

14. The element according to claim 1, wherein the ultraviolet light-absorbing substance absorbs for at least 75 percent in the wavelength range below 410 nm.

15. An element according to claim 14, wherein the ultraviolet light-absorbing substance corresponds to one of the formulae:

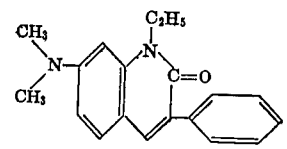

and/[or]

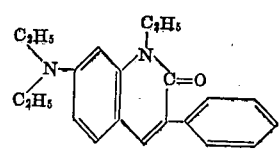

16. A combination of radiation-sensitive elements comprising the radiographic image-recording element described in claim 1, having in effective contact with said emulsion layers a fluorescent screen comprising a fluorescent material which when struck by X-ray radiation emits radiation at least 50 percent of which is in the wavelength range below 410 nm.

17. A combination according to claim 16, wherein said screen is arranged as separate elements that during radiographic exposure are held in contact with the opposite sides of said radiographic recording element.

18. A combination according to claim 16, wherein as an integral arrangement the silver halide emulsion layers and the fluorescent screen is provided on one and the same support.

19. A combination according to claim 16, wherein the fluorescent screen comprises fluorescent substances selected from the group consisting of lead-activated barium sulphate, europium-activated barium orthophosphate, europium-activated barium sulphate, lead-activated strontium sulphate, europium-activated strontium sulphate, cerium-activated barium sulphate, lead sulphate, lead-activated barium silicates, gadolinium-activated yttrium oxide, barium fluoride, and europium-activated barium strontium sulphate.

20. The element of claim 11 wherein each of $R_1$ and $R_2$ represent a member of the group consisting of an aliphatic carboxylic acid acyl group, an aromatic carboxylic acid acyl group, an heterocyclic carboxylic acid acyl group, an aliphatic sulphonic acid acyl group, an aromatic sulphonic acid acyl group, a sulphonyl thienyl group, an aryloxy-substituted aliphatic carboxylic acid acyl group, a phenyl carbamyl aliphatic carboxylic acid acyl group, and a tolyl carboxylic acid acyl group.

* * * * *